US007677451B2

(12) United States Patent
Dickover et al.

(10) Patent No.: US 7,677,451 B2
(45) Date of Patent: Mar. 16, 2010

(54) REDUCING INCIDENT INFRARED RADIATION RECEIVED BY ONE OR MORE INFRARED DETECTORS IN A SELF CHECKOUT POINT OF SALE SYSTEM

(75) Inventors: Wesley D. Dickover, Stuart, FL (US); Charles C. Sloop, III, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 11/960,920

(22) Filed: Dec. 20, 2007

(65) Prior Publication Data

US 2009/0162601 A1 Jun. 25, 2009

(51) Int. Cl.
*G06K 15/00* (2006.01)
(52) U.S. Cl. .................. 235/383; 235/379; 235/472.01
(58) Field of Classification Search ................. 235/383, 235/380, 385, 381, 379, 472.01
See application file for complete search history.

(56) References Cited

U.S. PATENT DOCUMENTS 5,609,223 A * 3/1997 Iizaka et al. ................. 186/61
6,427,915 B1 * 8/2002 Wike et al. .................. 235/383
7,044,370 B2 * 5/2006 Bellis et al. ................. 235/383
7,337,960 B2 * 3/2008 Ostrowski et al. ........... 235/383
7,386,472 B1 * 6/2008 Bogat ........................ 705/23
7,492,973 B2 * 2/2009 Cato ......................... 382/312
2004/0220860 A1 * 11/2004 Persky et al. ................ 705/23

* cited by examiner

*Primary Examiner*—Ahshik Kim
(74) *Attorney, Agent, or Firm*—John R. Biggers; Jason O. Piche; Biggers & Ohaninan, LLP.

(57) ABSTRACT

A self checkout POS system including a security zone; an emitting tower including one or more infrared emitters; a detecting tower including one or more infrared detectors, the detecting tower located on a side of the security zone opposite the side on which the emitting tower is located, the infrared detectors of the detecting tower aligned for reception of infrared radiation emitted by the infrared emitters of the emitting tower; a security shield installed on one side of the detecting tower; and a security shield installed on one side of the emitting tower, the security shield installed on one side of the emitting tower including: a clear acrylic pane; and a polycarbonate film having a matte finish, the polycarbonate film laminated to the clear acrylic pane with an adhesive, the polycarbonate film capable of reducing incident infrared radiation transmitted through and reflected by the clear acrylic pane.

7 Claims, 3 Drawing Sheets

US 7,677,451 B2

REDUCING INCIDENT INFRARED RADIATION RECEIVED BY ONE OR MORE INFRARED DETECTORS IN A SELF CHECKOUT POINT OF SALE SYSTEM

BACKGROUND OF THE INVENTION

1. Field of the Invention

The field of the invention is data processing, or, more specifically, security shields, self checkout point of sale ('POS') systems, and methods for manufacturing security shields for reducing incident infrared radiation received by one or more infrared detectors in a self checkout point of sale system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Advancements in computer systems have enabled many technologies including, for example, self checkout retail point of sale ('POS') systems. Self checkout POS systems enable a user to purchase retail items typically without the need of human intervention. Because human operation is normally unnecessary for self checkout POS systems, safeguards are typically put into place to reduce theft of retail items. One such safeguard includes a security zone, an area in which a retail customer is physically impeded from a retail item to be purchased and where measurements of the item are taken. The measurements are stored such that when the barcode of the item is scanned for purchase, the scanned item's measurements are compared to the actual measurements taken of the item in the security zone for verification. Such measurements are typically taken through a combination of infrared emitters and detectors. To physically impede customers from the retail item in the security zone, security shields are installed. Such security shields are typically transparent in order to provide visibility of the security zone including items to be purchased to both customers and employees. Due to reflection and transmission of ambient light, stray infrared radiation from infrared emitters, and stray infrared radiation from other sources, the security zone often provides faulty measurements by the combination of infrared emitters and detectors. What is needed, therefore, is a security shield for reducing incident infrared radiation received by the detectors of the security zone in a self checkout POS system.

SUMMARY OF THE INVENTION

Methods for manufacturing security shields for reducing incident infrared radiation received by one or more infrared detectors in a self checkout POS system are described that include attaching, with an adhesive, a polycarbonate film having a matte finish to one side of a clear acrylic pane, the polycarbonate film capable of reducing incident infrared radiation transmitted through and reflected by the clear acrylic pane.

Self checkout POS systems are disclosed that include a security zone, the security zone including an area in which measurements of retail items are taken; an emitting tower including one or more infrared emitters, the emitting tower located on one side of the security zone; a detecting tower including one or more infrared detectors, the detecting tower located on a side of the security zone opposite the side on which the emitting tower is located, the infrared detectors of the detecting tower aligned for reception of infrared radiation emitted by the infrared emitters of the emitting tower; a security shield installed on one side of the detecting tower; and a security shield installed on one side of the emitting tower, the security shield installed on one side of the emitting tower including: a clear acrylic pane; and a polycarbonate film having a matte finish, the polycarbonate film laminated to the clear acrylic pane with an adhesive, the polycarbonate film capable of reducing incident infrared radiation transmitted through and reflected by the clear acrylic pane.

Security shields for reducing incident infrared radiation received by one or more infrared detectors in a self checkout POS system are disclosed that include a clear acrylic pane; and a polycarbonate film having a matte finish, the polycarbonate film laminated to the clear acrylic pane with an adhesive, the polycarbonate film capable of reducing incident infrared radiation transmitted through and reflected by the clear acrylic pane.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
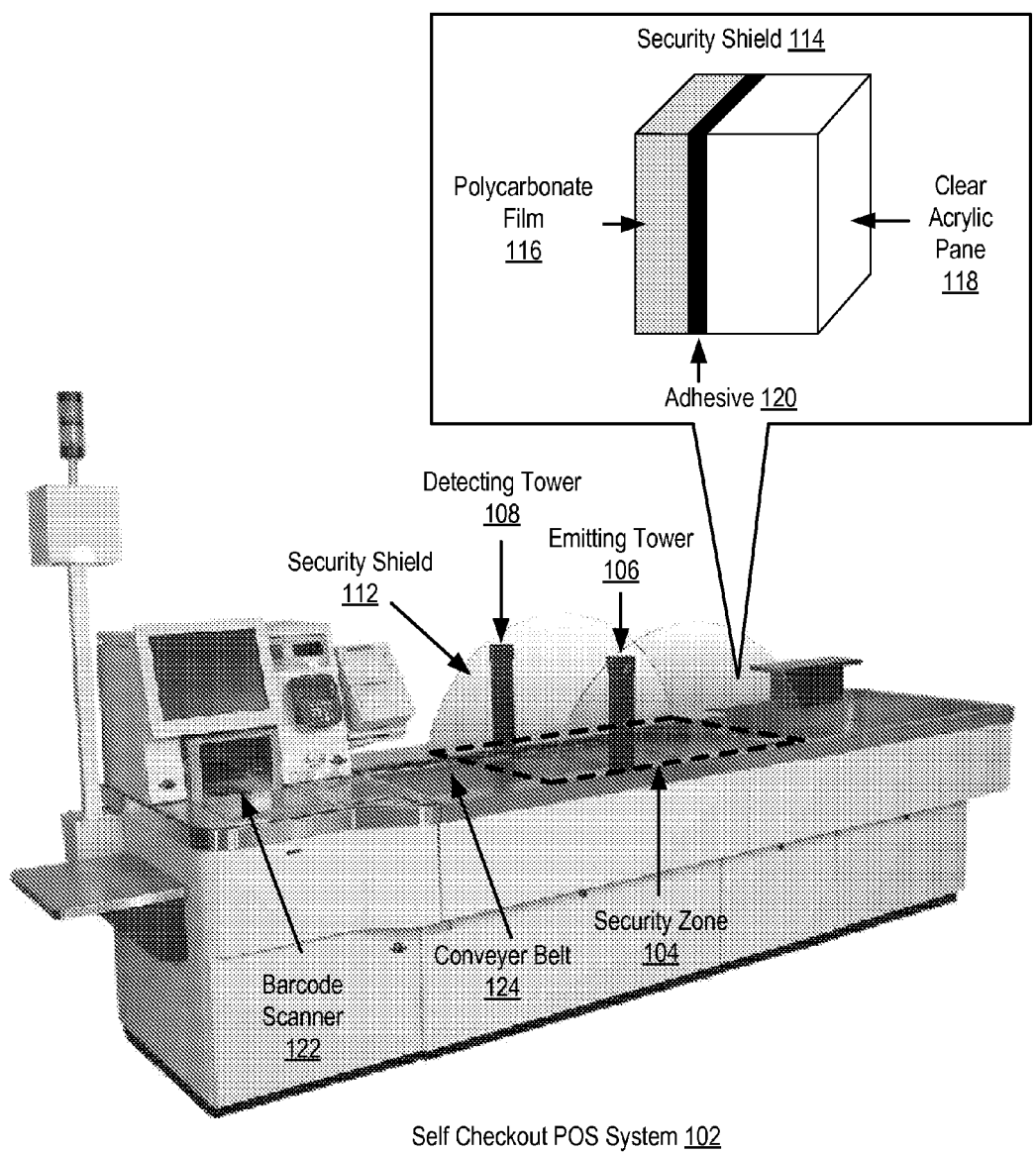
FIG. 1 sets forth an exemplary self checkout POS system for reducing incident infrared radiation received by one or more infrared detectors according to embodiments of the present invention.

Exemplary self checkout point of sale ('POS') systems, security shields, and methods for reducing incident infrared radiation received by one or more infrared detectors in a self checkout point of sale system in accordance with the present invention are described with reference to the accompanying drawings, beginning with FIG. 1. FIG. 1 sets forth an exemplary self checkout POS system (102) for reducing incident infrared radiation received by one or more infrared detectors according to embodiments of the present invention. The system of FIG. 1 includes a security zone (104), represented for clarity by a dotted line. The exemplary security zone (104) of FIG. 1 is an area in which measurements of retail items are taken for verification when the item's barcode is scanned for purchase. In the system of FIG. 1, for example, the height of an item may be measured while the item travels down the conveyer belt (124) toward the barcode scanner (122). When the item's barcode is scanned, the self checkout POS system (102) compares the measured height with a previously stored height of the item for verification. Examples of self checkout POS systems having such a security zone include IBM's self checkout system 4845, models 800 and 810.

The exemplary self checkout POS system (102) of FIG. 1 also includes an emitting tower (106) including one or more infrared emitters. In the exemplary self checkout POS system (102) of FIG. 1, the emitting tower (106) is located on one side of the security zone (104). The exemplary self checkout POS system (102) of FIG. 1 also includes a detecting tower (108) including one or more infrared detectors. In the exemplary self checkout POS system (102) of FIG. 1, the detecting tower (108) located on a side of the security zone opposite the side on which the emitting tower (106) is located. In the example of FIG. 1, the infrared detectors of the detecting tower (108) are aligned for reception of infrared radiation emitted by the infrared emitters of the emitting tower (106).

The exemplary self checkout POS system (102) of FIG. 1 also includes a security shield (112) installed on one side of the detecting tower (108) and a security shield (114) installed on one side of the emitting tower (106). In the example of FIG. 1, the security shield is a half-oval shape. Readers of skill in the art will recognize, however, that security shields in accordance with embodiments of the present invention may be of any shape.

In the example of FIG. 1, the security shield (114) installed on one side of the emitting tower (106) includes a clear acrylic pane (118) and a polycarbonate film (116) having a matte finish. The exemplary polycarbonate film (116) in the example of FIG. 1 is laminated to the clear acrylic pane (118) with an adhesive (120) and is capable of reducing incident infrared radiation transmitted through and reflected by the clear acrylic pane (118). Although an opaque polycarbonate film, will reduce and in fact eliminate the incident infrared radiation transmitted through and reflected by the clear acrylic pane (118), some visibility of the security zone, including the item to be purchased, is typically desired. The matte finish of the polycarbonate film (116) serves to reduce the incident radiation while providing some visibility to the security zone.

In the example of FIG. 1, the polycarbonate film (116) of the security shield (114) is capable of reducing incident infrared radiation transmitted through and reflected by the clear acrylic pane where the infrared radiation is characterized by a wavelength between 850 and 1000 nanometers. In self checkout POS systems for reducing incident infrared radiation received by infrared detectors in accordance with embodiments of the present invention, the polycarbonate film (116) may be between 0.005 and 0.03 inches in thickness and is typically 0.02 inches in thickness.

Also in self checkout POS systems for reducing incident infrared radiation received by infrared detectors in accordance with embodiments of the present invention, the clear acrylic pane (118) of the security shield (114) is typically 0.375 inches in thickness. A sheet of clear acrylic, from which a pane of clear acrylic may be cut or stamped, is typically 0.375 inches in thickness, 4 feet in length, and 8 feet in height.

The arrangement of towers, security zones, security shields, and other devices making up the exemplary self checkout POS system (102) illustrated in FIG. 1 are for explanation, not for limitation. Self checkout POS systems useful according to various embodiments of the present invention may include additional towers, conveyer belts, barcode scanners, scales, cash machines, and other devices, not shown in FIG. 1, as will occur to those of skill in the art. Various embodiments of the present invention may be implemented on a variety of hardware platforms in addition to those illustrated in FIG. 1.

Figure 2:
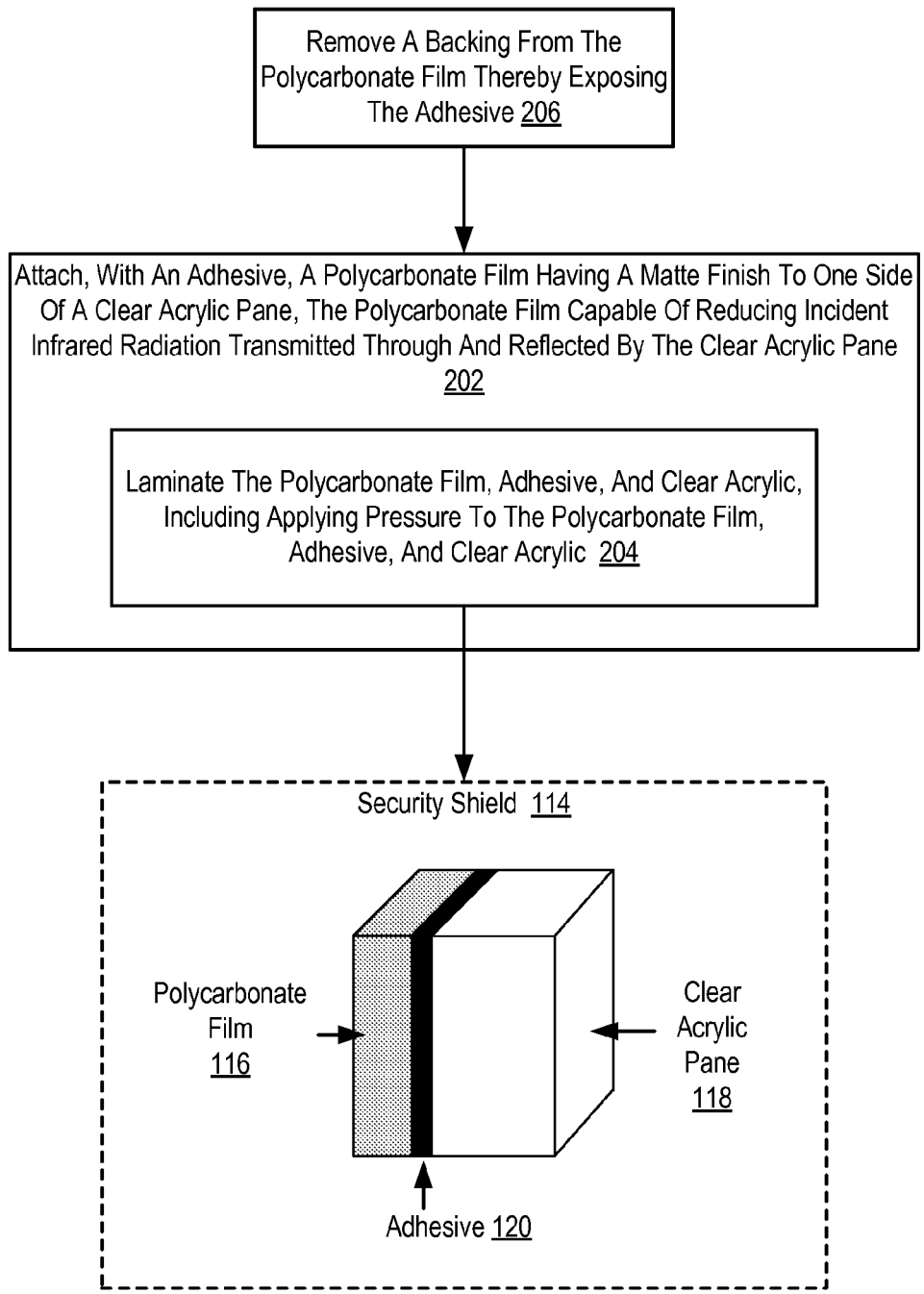
FIG. 2 sets forth a flow chart illustrating an exemplary method for manufacturing a security shield for reducing incident infrared radiation received by one or more infrared detectors in a self checkout point of sale system according to embodiments of the present invention.

For further explanation, FIG. 2 sets forth a flow chart illustrating an exemplary method for manufacturing a security shield for reducing incident infrared radiation received by one or more infrared detectors in a self checkout point of sale system according to embodiments of the present invention. The method of FIG. 2 includes attaching (202), with an adhesive (120), a polycarbonate film (116) having a matte finish to one side of a clear acrylic pane (118), the polycarbonate film (116) capable of reducing incident infrared radiation transmitted through and reflected by the clear acrylic pane (118).

Attaching (202), with an adhesive (120), a polycarbonate film (116) to one side of a clear acrylic pane (118) may be carried out in several ways. In the method of FIG. 2, for example, if the adhesive is a pressure sensitive adhesive, attaching (202) a polycarbonate film (116) to one side of a clear acrylic pane (118) is carried out by laminating (204) the polycarbonate film (116), adhesive (120), and clear acrylic pane (118), including applying pressure to the polycarbonate film (116), adhesive (120), and clear acrylic pane (118). Applying pressure may include rolling the three elements with one or more industrial rollers such that air between the polycarbonate film and the clear acrylic pane is reduced or eliminated. As an alternative to applying pressure, if the adhesive is heat sensitive, laminating the polycarbonate film, adhesive, and clear acrylic pane may include applying heat to the three elements.

The method of FIG. 2 also includes, removing (204), before attaching (202) the polycarbonate film (116) to one side of the clear acrylic pane (118), a backing from the polycarbonate film (116) thereby exposing the adhesive (120). In existing self checkout POS systems having security shields without the polycarbonate film, it may be impractical to remove the existing shields and laminate the polycarbonate film to the shield in a manufacturing plant, remote with respect to the site of the existing self checkout POS system. As an alternative the polycarbonate film may be attached directly to the clear acrylic pane of the existing shield at the site by using polycarbonate film having adhesive covered by a backing. That is, the polycarbonate film and adhesive combination is manufactured before attaching the polycarbonate film to the clear acrylic pane. In such cases, attaching the polycarbonate film to the clear acrylic pane may be carried out by applying the polycarbonate film having the adhesive to the clear acrylic pane and then rolling over the polycarbonate film with a hand-held roller.

Figure 3:
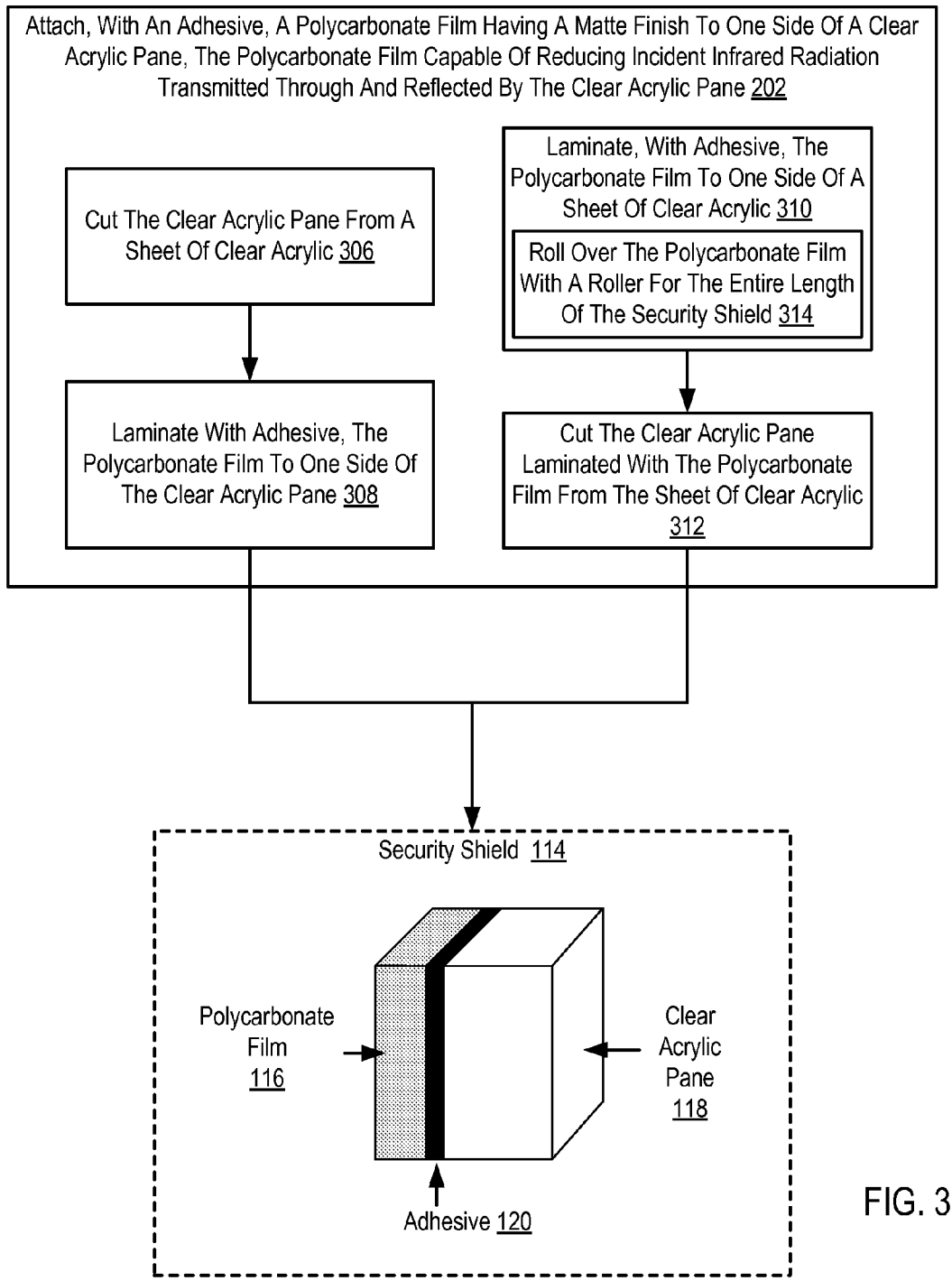
FIG. 3 sets forth a flow chart illustrating a further exemplary method for manufacturing a security shield for reducing incident infrared radiation received by one or more infrared detectors in a self checkout point of sale system according to embodiments of the present invention.

For further explanation, FIG. 3 sets forth a flow chart illustrating a further exemplary method for manufacturing a security shield for reducing incident infrared radiation received by one or more infrared detectors in a self checkout point of sale system according to embodiments of the present invention that includes several alternative methods of attaching (202) a polycarbonate film (116) to one side of a clear acrylic pane (118). The method of FIG. 3 is similar to the method of FIG. 2 in that the method of FIG. 3 also includes attaching (202) a polycarbonate film (116) having a matte finish to one side of a clear acrylic pane (202). The method of FIG. 3 differs from the method of FIG. 2, however, in that in the method of FIG. 3 attaching (202) a polycarbonate film (116) having a matte finish to one side of a clear acrylic pane (202) may be carried out by cutting (306) the clear acrylic pane (118) from a sheet of clear acrylic and after cutting (306) the clear acrylic pane (118) from the sheet of clear acrylic, laminating (308), with adhesive, the polycarbonate film (308) to one side of the clear acrylic pane (118).

Cutting (306) the clear acrylic pane (118) from a sheet of clear acrylic may be carried out by cutting with a saw, drill, or other tool or by stamping out the clear acrylic pane from the sheet of clear acrylic. As mentioned above, a typical sheet of clear acrylic measures 4 feet by 8 feet and 0.375 inches in thickness. Also mentioned above, the clear acrylic panes, in fact the entire security shield, is typically of half-oval shape. In manufacturing large quantities of security shields it may be advantageous, that is, cost effective and time effective, to stamp out such half-oval clear acrylic panes from sheets of clear acrylic.

As an alternative to cutting (306) the clear acrylic pane from a sheet of clear acrylic, attaching (202) a polycarbonate film (116) having a matte finish to one side of a clear acrylic pane (202) may also be carried out by laminating (310), with adhesive (120), the polycarbonate film (116) to one side of a sheet of clear acrylic and after laminating (310) the polycarbonate film (116) to one side of the sheet of clear acrylic, cutting (312) the clear acrylic pane (118) laminated with the polycarbonate film (116) from the sheet of clear acrylic. In the method of FIG. 3, laminating (310) the polycarbonate film (116) to one side of a sheet of clear acrylic includes rolling (314) over the polycarbonate film (116) with a roller for the entire length of the sheet of clear acrylic. That is, instead of first cutting the clear acrylic pane from a sheet of clear acrylic and then laminating the pane with the polycarbonate film, the polycarbonate film is first laminated to an entire sheet of clear acrylic and the completed security shield is cut from the sheet.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A self checkout point of sale system, the self checkout point of sale system comprising:

a security zone, the security zone comprising an area in which measurements of retail items are taken;

an emitting tower including one or more infrared emitters, the emitting tower located on one side of the security zone;

a detecting tower including one or more infrared detectors, the detecting tower located on a side of the security zone opposite the side on which the emitting tower is located, the infrared detectors of the detecting tower aligned for reception of infrared radiation emitted by the infrared emitters of the emitting tower;

a security shield installed on one side of the detecting tower; and a security shield installed on one side of the emitting tower, the security shield installed on one side of the emitting tower comprising:

a clear acrylic pane; and a polycarbonate film having a matte finish, the polycarbonate film laminated to the clear acrylic pane with an adhesive, the polycarbonate film capable of reducing incident infrared radiation transmitted through and reflected by the clear acrylic pane.

2. The self checkout point of sale system of claim 1 wherein the wherein the reduced incident infrared radiation transmitted through and reflected by the clear acrylic pane is characterized by a wavelength between 850 and 1000 nanometers.

3. The self checkout point of sale system of claim 1 wherein the clear acrylic pane is 0.375 inches in thickness.

4. The self checkout point of sale system of claim 1 wherein the polycarbonate film is between 0.005 and 0.03 inches in thickness.

5. The self checkout point of sale system of claim 4 wherein the polycarbonate film is 0.02 inches in thickness.

6. The self checkout point of sale system of claim 1 wherein the security shields comprise a half-oval shape.

7. The self checkout point of sale system of claim 1 wherein the clear acrylic pane is cut from a sheet of clear acrylic.

* * * * *